(12) United States Patent
Cheng et al.

(10) Patent No.: US 10,447,051 B2
(45) Date of Patent: Oct. 15, 2019

(54) ELECTRIC FAN-TYPE POWER GENERATING DEVICE WITH LOW ENERGY CONSUMPTION

(71) Applicants: Chun-Ying Cheng, Taoyuan (TW); Jung-Chieh Cheng, Taoyuan (TW)

(72) Inventors: Chun-Ying Cheng, Taoyuan (TW); Jung-Chieh Cheng, Taoyuan (TW)

(*) Notice: Subject to any disclaimer, the term of this patent is extended or adjusted under 35 U.S.C. 154(b) by 281 days.

(21) Appl. No.: 15/489,780

(22) Filed: Apr. 18, 2017

(65) Prior Publication Data

US 2018/0298883 A1   Oct. 18, 2018

(51) Int. Cl.
| | |
|---|---|
| *H02J 7/00* | (2006.01) |
| *F03D 9/25* | (2016.01) |
| *F04D 19/00* | (2006.01) |
| *F03D 9/00* | (2016.01) |
| *H02K 7/14* | (2006.01) |
| *H02K 7/18* | (2006.01) |
| *F03G 7/10* | (2006.01) |
| *F04D 25/06* | (2006.01) |
| *H02J 7/14* | (2006.01) |

(52) U.S. Cl.
CPC .............. *H02J 7/0052* (2013.01); *F03D 9/00* (2013.01); *F03D 9/25* (2016.05); *F03G 7/10* (2013.01); *F04D 19/002* (2013.01); *F04D 25/0606* (2013.01); *H02J 7/1415* (2013.01); *H02K 7/14* (2013.01); *H02K 7/183* (2013.01); *H02K 7/1823* (2013.01); *F05B 2220/60* (2013.01); *Y02E 10/725* (2013.01)

(58) Field of Classification Search
CPC ......... H02J 7/0052; H02J 7/1415; F03D 9/00; F03D 9/25; F04D 19/002; F04D 25/0606; F03G 7/10; H02K 7/183; H02K 7/14; H02K 7/1823; F05B 2220/60; F05B 2220/602; F05B 2220/604; Y02E 10/725
See application file for complete search history.

(56) References Cited

U.S. PATENT DOCUMENTS

| | | | |
|---|---|---|---|
| 6,232,690 B1 * | 5/2001 | Schmider | F04D 25/0653 310/112 |
| 7,208,846 B2 * | 4/2007 | Liang | F03D 9/00 290/1 R |

(Continued)

*Primary Examiner* — Devon C Kramer
*Assistant Examiner* — Christopher J Brunjes
(74) *Attorney, Agent, or Firm* — Alan D. Kamrath; Karin L. Williams; Mayer & Williams PC

(57) ABSTRACT

An electric fan-type power generating device with low energy consumption includes a housing receiving an electric motor connected to a first fan. A generator is mounted in the housing and is connected to a second fan. The first and second fans are offset from each other. A power device includes a chargeable battery for supplying electricity to the electric motor that drives the first fan to generate wind power close to the second fan. Air flows around in a housing and generates turbulence to proceed with input and output of air, increasing the heat dissipating effect of the electric motor and the generator. Furthermore, the second fan drives the generator to generate electricity supplied to the chargeable battery. The chargeable battery recycles the electricity and supplies the electricity to the electric motor that operates to generate wind power. Furthermore, the wind energy drives the generator to continue generation of electricity.

8 Claims, 9 Drawing Sheets

(56) References Cited

U.S. PATENT DOCUMENTS

| | | | | |
|---|---|---|---|---|
| 8,183,709 B1* | 5/2012 | Manning | ............... | F03D 9/00 290/55 |
| 8,884,453 B2* | 11/2014 | Barzilai | ............... | F03D 9/00 290/50 |
| 2012/0091710 A1* | 4/2012 | Evans | ............... | F01D 15/10 290/43 |
| 2012/0167721 A1* | 7/2012 | Fluhrer | ............... | B25B 21/00 81/54 |
| 2015/0260154 A1* | 9/2015 | Thomazios | ............... | F03D 9/00 416/124 |
| 2017/0229939 A1* | 8/2017 | Cheng | ............... | H02K 7/1823 |

* cited by examiner

ELECTRIC FAN-TYPE POWER GENERATING DEVICE WITH LOW ENERGY CONSUMPTION

BACKGROUND OF THE INVENTION

The present invention relates to a power generating device and, more particularly, to an electric fan-type power generating device with low energy consumption.

Various fans use main power as the power source for driving a motor to rotate fan blades. The air behind the fan blades is driven forward to generate wind power making air flow.

However, these fans using motors must be powered by the main power and, thus, cannot be used anytime and anywhere. Furthermore, the mechanical energy generated by the motor is not recycled and reused. Namely, the mechanical energy is direct power loss. The cumulative loss of energy is considerable. Thus, it is an important issue to persons in this field.

BRIEF SUMMARY OF THE INVENTION

The primary objective of the present invention is to provide an electric fan-type power generating device with low energy consumption. An electric motor drives a first fan to rotate to thereby generate wind power close to a second fan offset from the first fan. Air flows around in a housing and generates turbulence to proceed with input and output of air, increasing the heat dissipating effect of the electric motor and a generator. Furthermore, the second fan drives the generator to generate electricity that can be supplied to a chargeable battery of a power device. The chargeable battery recycles the electricity and supplies the electricity to the electric motor that operates to generate wind power. Furthermore, the wind energy drives the generator to continue generation of electricity. Accordingly, the present invention can be directly used anytime and anywhere while prolonging the service time of the chargeable battery.

Another objective of the present invention is to provide an electric motor that increases the rotational speed of the first fan for increasing the wind power or decreases the rotational speed of the first fan for increasing the torque.

A further objective of the present invention is to provide a power device and a chargeable battery to output electricity to an external electric appliance according to need.

An electric fan-type power generating device with low energy consumption according to the present invention includes a housing having a first sidewall, a second sidewall opposite to the first side wall, and a peripheral wall interconnected between the first sidewall and the second sidewall. The housing includes a plurality of vents. An electric motor is mounted in the housing. The electric motor includes a first stator and a first rotor concentric to the first stator. A first shaft extends through a central portion of the first rotor and coupled to the first rotor. A first fan is driven by the first rotor and the first shaft of the electric motor. A generator is mounted in the housing and includes a second stator and a second rotor concentric to the second stator. A second fan drives the second rotor of the generator to rotate. The first fan and the second fan are located opposite to and adjacent to each other. A power device is mounted in the housing and includes a chargeable battery connected to a start switch. The chargeable battery is connected to the generator. The start switch is connected to the electric motor.

When the chargeable battery supplies electricity to the electric motor, the first shaft of the electric motor drives the first fan to rotate to thereby generate wind power close to the second fan. The second fan is driven by the wind power to drive the second rotor of the generator, and the generator generates electricity to the chargeable battery.

The first fan has a central axis offset from a central axis of the second fan in a radial direction perpendicular to the central axes. Air flows around in the housing and generates turbulence to proceed with input and output of air.

In an example, the housing further includes a support located between the first sidewall and the second sidewall. The electric motor includes a motor casing fixed to a side of the support facing the first sidewall. The first shaft includes an end extending to another side of the support. The generator is fixed to the second sidewall. The first fan is located between the support and the second fan. The second fan is located between the first fan and the second sidewall.

In an example, the plurality of vents of the housing is defined in the first sidewall, the second sidewall, the peripheral wall, and the support. A heat dissipating fan is fixed to another end of the first shaft.

In an example, the generator further includes a base fixed to the second sidewall. The generator further includes a second shaft rotatably mounted to a central portion of the base. The second fan includes a central portion fixed to the second shaft. The second rotor is concentrically mounted around the second stator. The second rotor is fixed to a rotor seat. The rotor seat includes a side fixed to a central portion of the second fan.

In an example, the first fan includes a central portion fixed to the end of the first shaft.

In an example, the first shaft of the electric motor includes an end fixed to a transmission wheel. An axle is fixed to the support. The first fan is rotatably mounted to the axle. A driven wheel is mounted around the axle and is coupled with the transmission wheel. The transmission wheel drives the driven wheel and the first fan to proceed with acceleration or deceleration of rotation.

In an example, a central axis of the second shaft is located between a central axis of the axle and a central axis of the first shaft in the radial direction.

In an example, the electric motor includes a motor casing fixed in the housing. The first shaft includes an end extending through a central portion of the second fan. A transmission wheel is fixed to the end of the first shaft. An axle is fixed to the first sidewall of the housing. The first fan is rotatably mounted to the axle. A driven wheel is mounted around the axle. The transmission wheel drives the driven wheel and the first fan to increase a rotational speed for increasing the wind power. The generator is concentrically mounted around the electric motor. The second rotor is securely mounted around a rotor seat. The rotor seat includes a side fixed to the central portion of the second fan. The central portion of the second fan is rotatably mounted to the motor casing of the electric motor.

In an example, the power device further includes a charging controller serially connected between the chargeable battery and the generator. The charging controller is electrically connected to a voltage boost controller for outputting electricity.

The present invention will become clearer in light of the following detailed description of illustrative embodiments of this invention described in connection with the drawings.

DETAILED DESCRIPTION OF THE INVENTION

Figure 1:
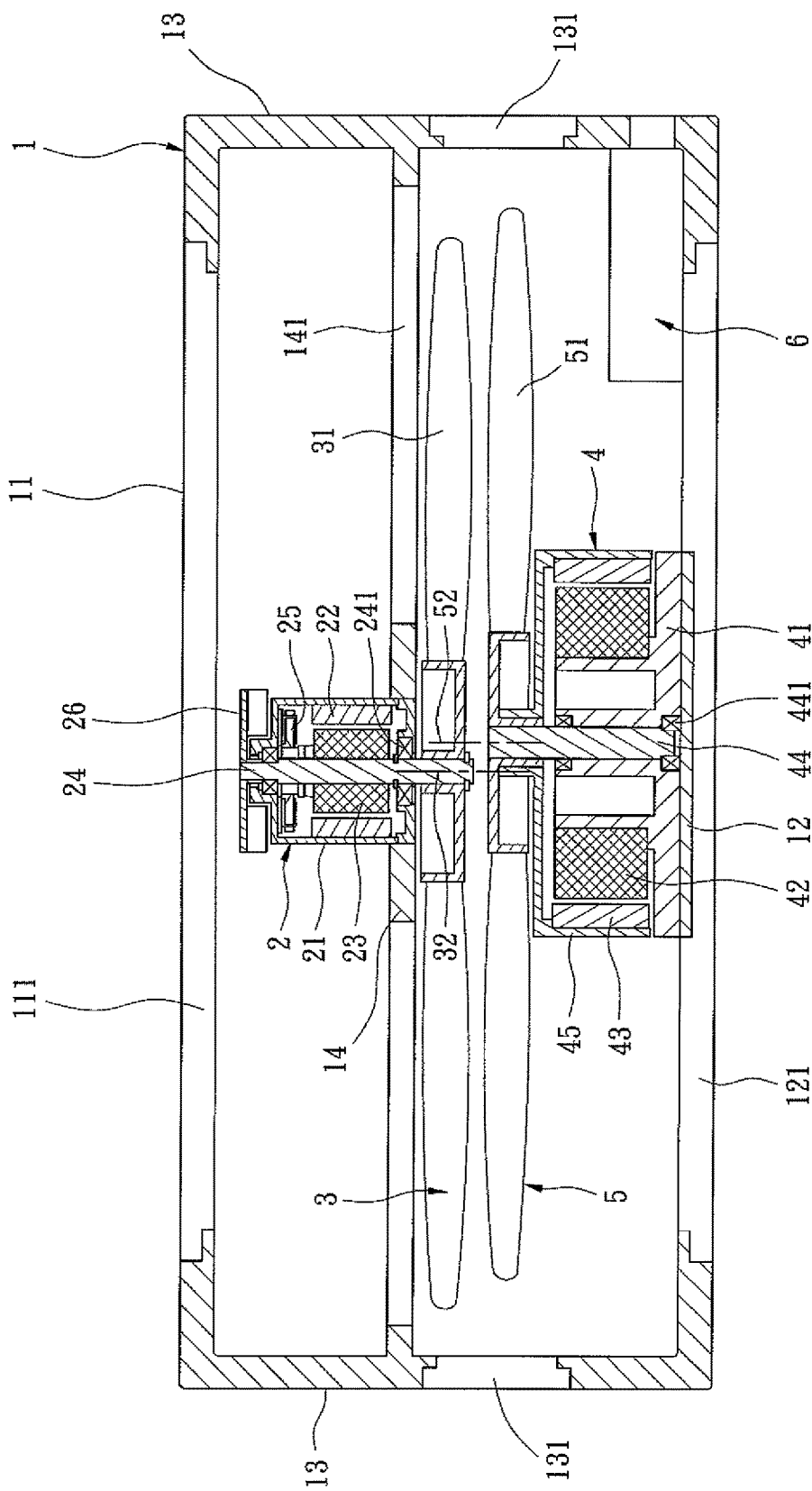
FIG. 1 is a diagrammatic cross sectional view of an electric fan-type power generating device with low energy consumption of a first example according to the present invention.
Figure 2:
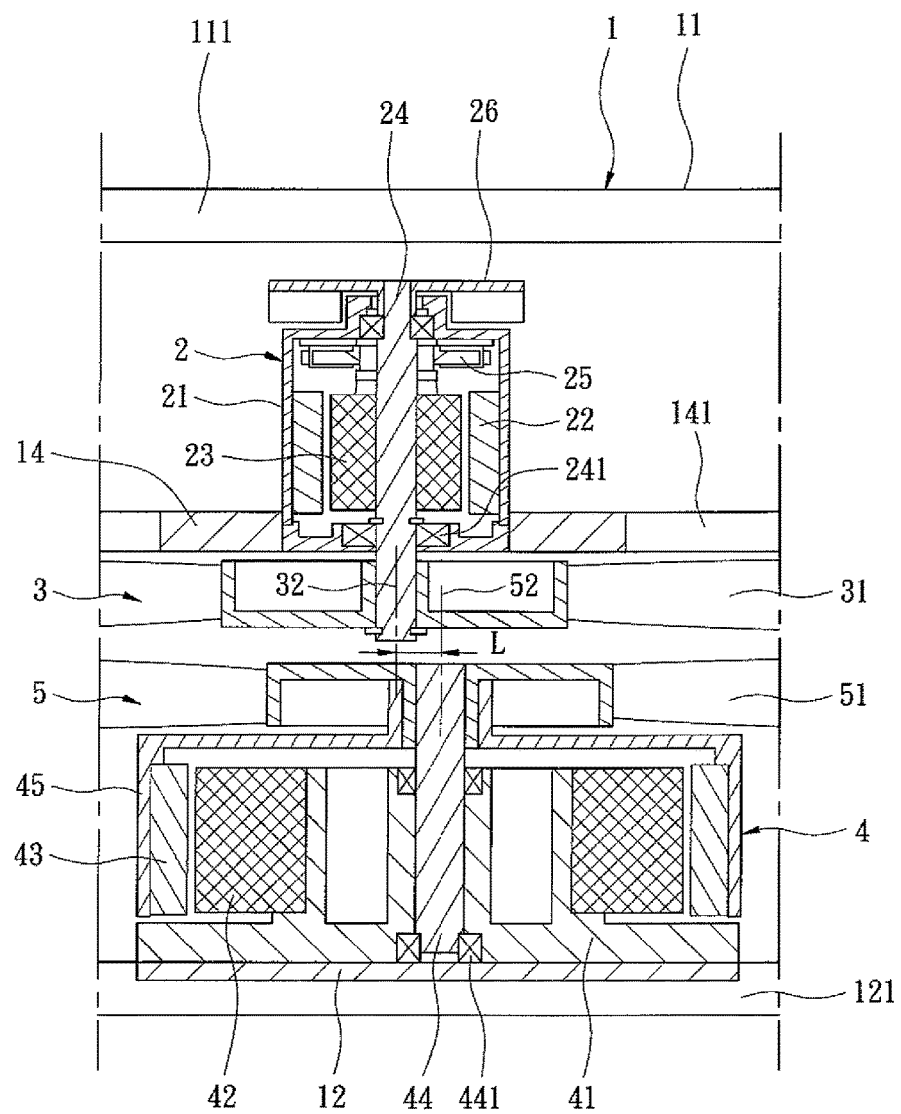
FIG. 2 is an enlarged view of a portion of the electric fan-type power generating device of FIG. 1.
Figure 3:
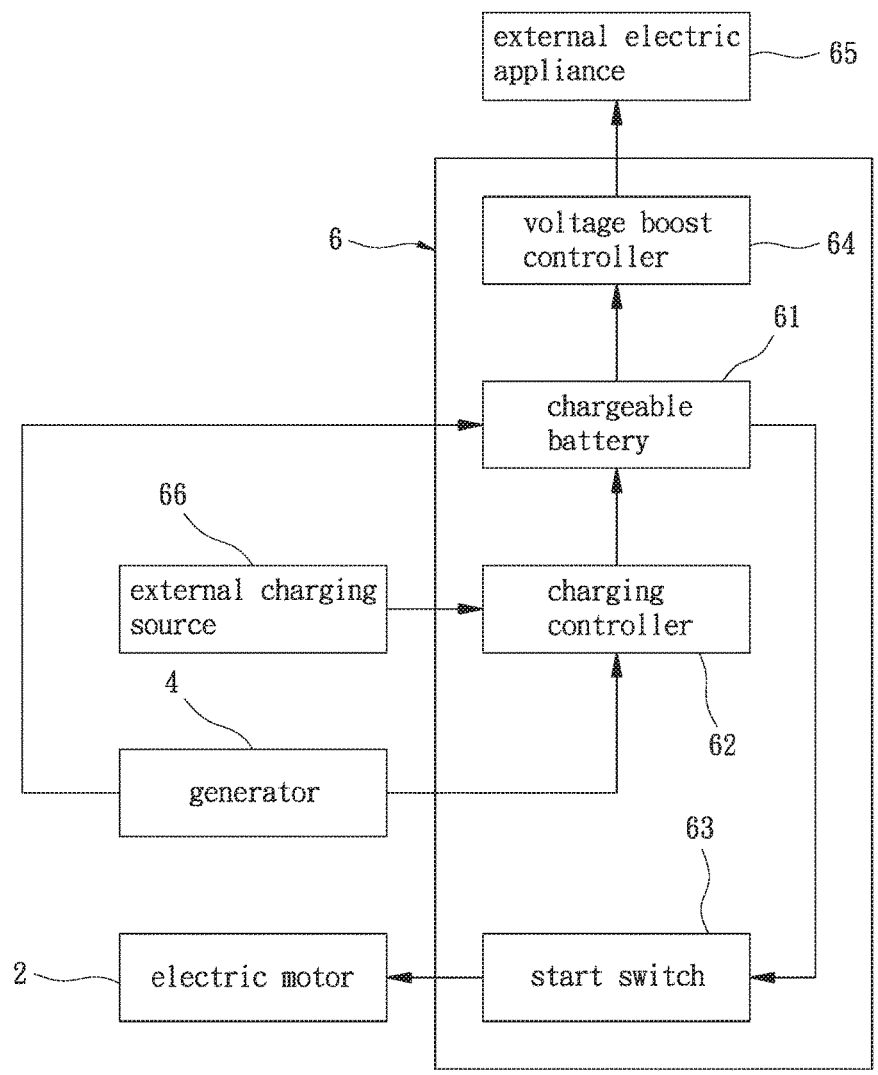
FIG. 3 is a block diagram of the electric fan-type power generating device of FIG. 1.

With reference to FIGS. 1-3, an electric fan-type power generating device with low energy consumption of a first example according to the present invention includes a housing 1 having a first sidewall 11, a second sidewall 12 opposite to the first sidewall 11, and a peripheral wall 13 interconnected between the first sidewall 11 and the second sidewall 12. The housing 1 further includes a support 14 extending parallel to and located between the first sidewall 11 and the second sidewall 12. Vents 111, 121, 131, and 141 are defined in the first sidewall 11, the second sidewall 12, the peripheral wall 13, and the support 14.

An electric motor 2 is mounted in the housing 1 and includes a first stator 22 and a first rotor 23 concentric to the first stator 22. The electric motor 2 further includes an electrically connected carbon brush 25. A first shaft 24 extends through a central portion of the first rotor 23 and is coupled to the first rotor 23. The electric motor 2 further includes a motor casing 21 fixed to a side of the support 14 facing the first sidewall 11. An end of the first shaft 24 extends through a bearing 241 to the other side of the support 14. A heat dissipating fan 26 is fixed to the other end of the first shaft 24.

A first fan 3 includes a plurality of fan blades 31 on an outer periphery thereof. A central portion of the first fan 3 is fixed to the end of the first shaft 24 of the electric motor 2. Thus, the first fan 3 can be driven by the first rotor 23 and the first shaft 24 of the electric motor 2.

A generator 4 is mounted in the housing 1 and includes a second stator 42 and a second rotor 43 concentrically mounted around the second stator 42. The generator 4 further includes a base 41 fixed to the second sidewall 12 of the housing 1. A second shaft 44 is rotatably mounted to a central portion of the base 41 and is supported by a bearing 441. The second rotor 43 is mounted around and spaced from the second stator 42. Furthermore, the second rotor 43 is fixed to a rotor seat 45.

The second fan 5 includes a plurality of fan blades 51 mounted on an outer periphery thereof. A central portion of the second fan 5 is fixed to the second shaft 44 and a side of the rotor seat 45 to drive the second rotor 43 of the generator 4 to rotate. The first fan 3 is located between the support 14 and the second fan 5. The second fan 5 is located between the first fan 3 and the second sidewall 12. Thus, the first fan 3 and the second fan 5 are located opposite to and adjacent to each other.

A power device 6 is mounted in the housing 1 and includes a chargeable battery 61 connected to a start switch 63. The chargeable battery 61 is connected to the generator 4. The start switch 63 is connected to the electric motor 2. Furthermore, the power device 6 further includes a charging controller 62 serially connected between the chargeable battery 61 and the generator 4. The charging controller 62 is electrically connected to a voltage boost controller 64 for outputting electricity to an external electric appliance 65 (such as a mobile phone, a tablet computer, a personal digital assistant, etc.) according to need. Furthermore, the charging controller 62 is selectively connected to an external charging source 66 or main power to charge the chargeable battery 61.

The main features of the present invention are that the central axis 32 of the first fan 3 is offset from the central axis 52 of the second fan 5. Namely, the central axis 32 of the first fan 3 is spaced from the central axis 52 of the second fan 5 in a radial direction perpendicular to the central axes 32 and 52 by a spacing L. Thus, air flows around in the housing 1 and generates turbulence to proceed with input and output of air via the vents 111, 121, 131, and 141.

When the chargeable battery 61 supplies electricity to the electric motor 2 by activating the start switch 63, the first shaft 24 of the electric motor 2 drives the first fan 3 to rotate to thereby generate wind power close to the second fan 5. The second fan 5 offset from the first fan 3 is driven by the wind power to drive the second rotor 43 of the generator 4. The generator 4 generates electricity and supplies the electricity to the chargeable battery 61. Thus, the chargeable battery 61 recycles the electricity and uses the electricity to drive the electric motor 2 to generate wind power which is used to drive the generator 4 to continue generation of electricity. Furthermore, the offset arrangement between the central axes 32 and 52 of the first fan 3 and the second fan 5, air flows around in the housing 1 and generates turbulence to proceed with input and output of air, increasing the heat dissipating effect of the electric motor 2 and the generator 4 to thereby assure the use efficiency. Accordingly, the present invention can be directly used anytime and anywhere while prolonging the service time of the chargeable battery 61. Furthermore, the power device 6 and the chargeable battery 61 can provide optional output of power source to the external electric appliance 65 via the voltage boost controller 64 according to need.

Figure 4:
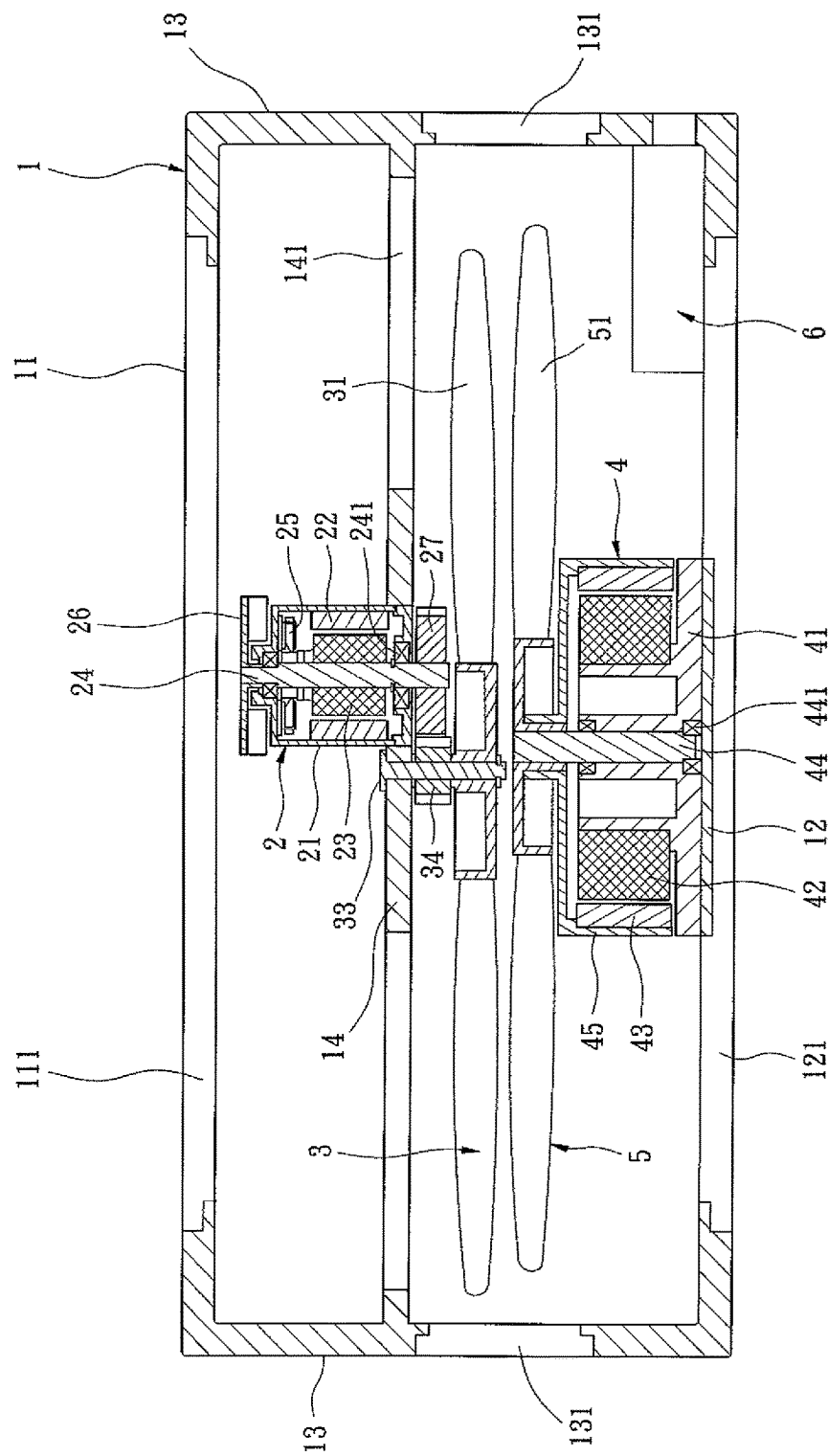
FIG. 4 is a diagrammatic cross sectional view of an electric fan-type power generating device with low energy consumption of a second example according to the present invention.
Figure 5:
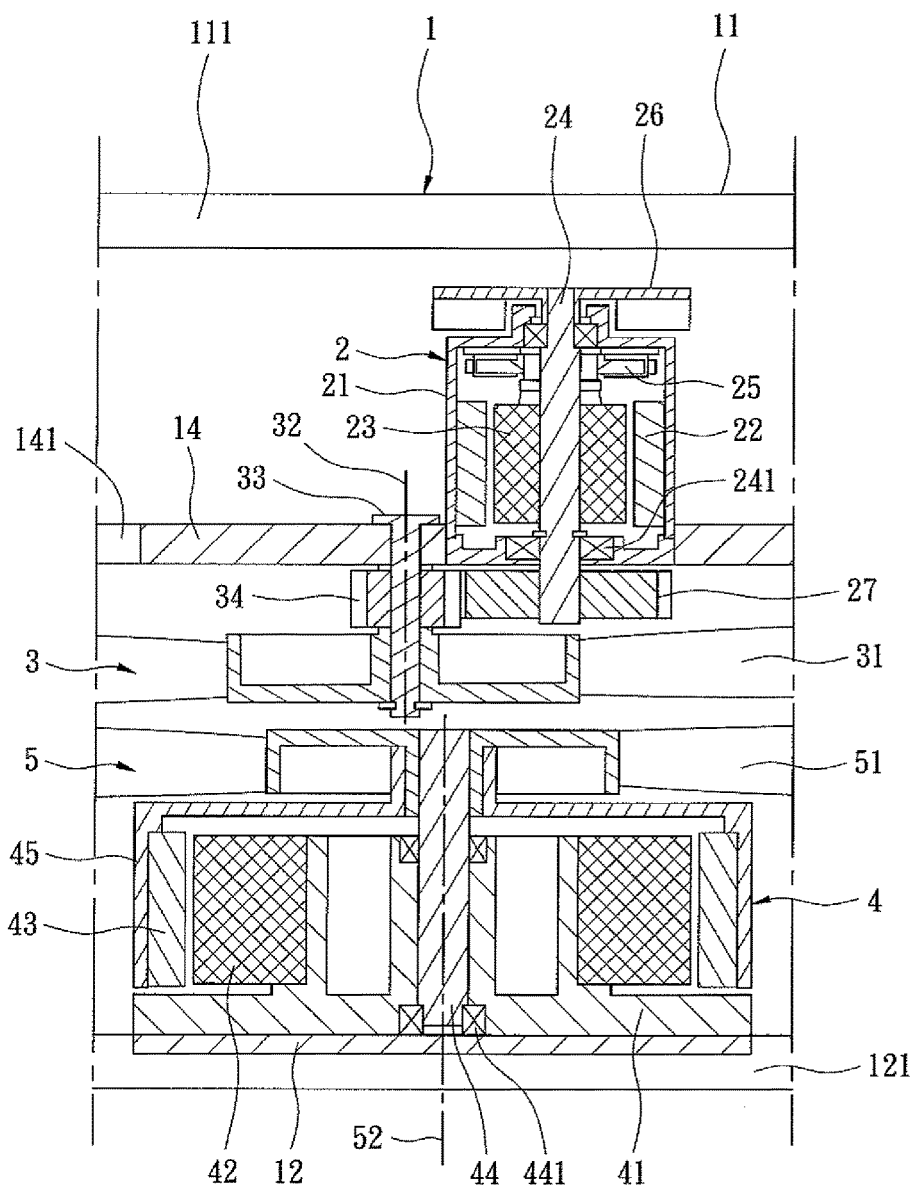
FIG. 5 is an enlarged view of a portion of the electric fan-type power generating device of FIG. 4.

FIGS. 4 and 5 show a second embodiment similar to the first embodiment, wherein like reference numerals are used to designate like elements. The second embodiment is different from the first embodiment by that an end of the first shaft 24 of the electric motor 2 is fixed to a transmission wheel 27, and an axle 33 is fixed to the other side of the support 14. The first fan 3 is rotatably mounted to the axle 33. A driven wheel 34 is mounted around the axle 33, is located at a side of a central portion of the first fan 3, and meshes with the transmission wheel 27. Thus, the transmission wheel 27 drives the driven wheel 34 and the first fan 3 to proceed with acceleration of rotation for increasing the wind power. In an alternative example, the transmission wheel 27 drives the first fan 3 for deceleration of rotation for the purposes of increasing the torque.

In this example, the central axis 52 of the second shaft 44 is located between the central axis 32 of the axle 33 and the central axis of the first shaft 24 in the radial direction.

Figure 6:
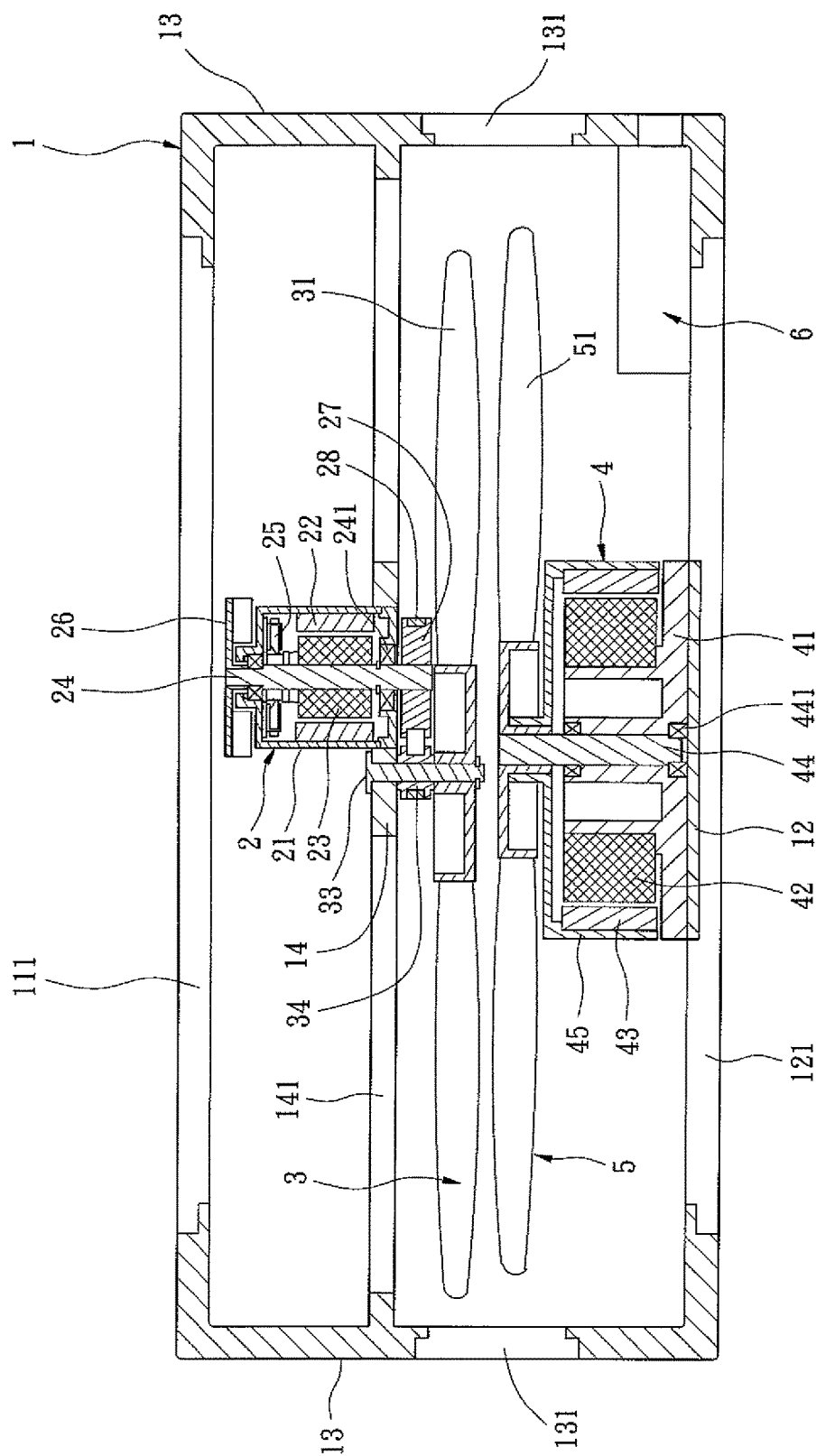
FIG. 6 is a diagrammatic cross sectional view of an electric fan-type power generating device with low energy consumption of a third example according to the present invention.
Figure 7:
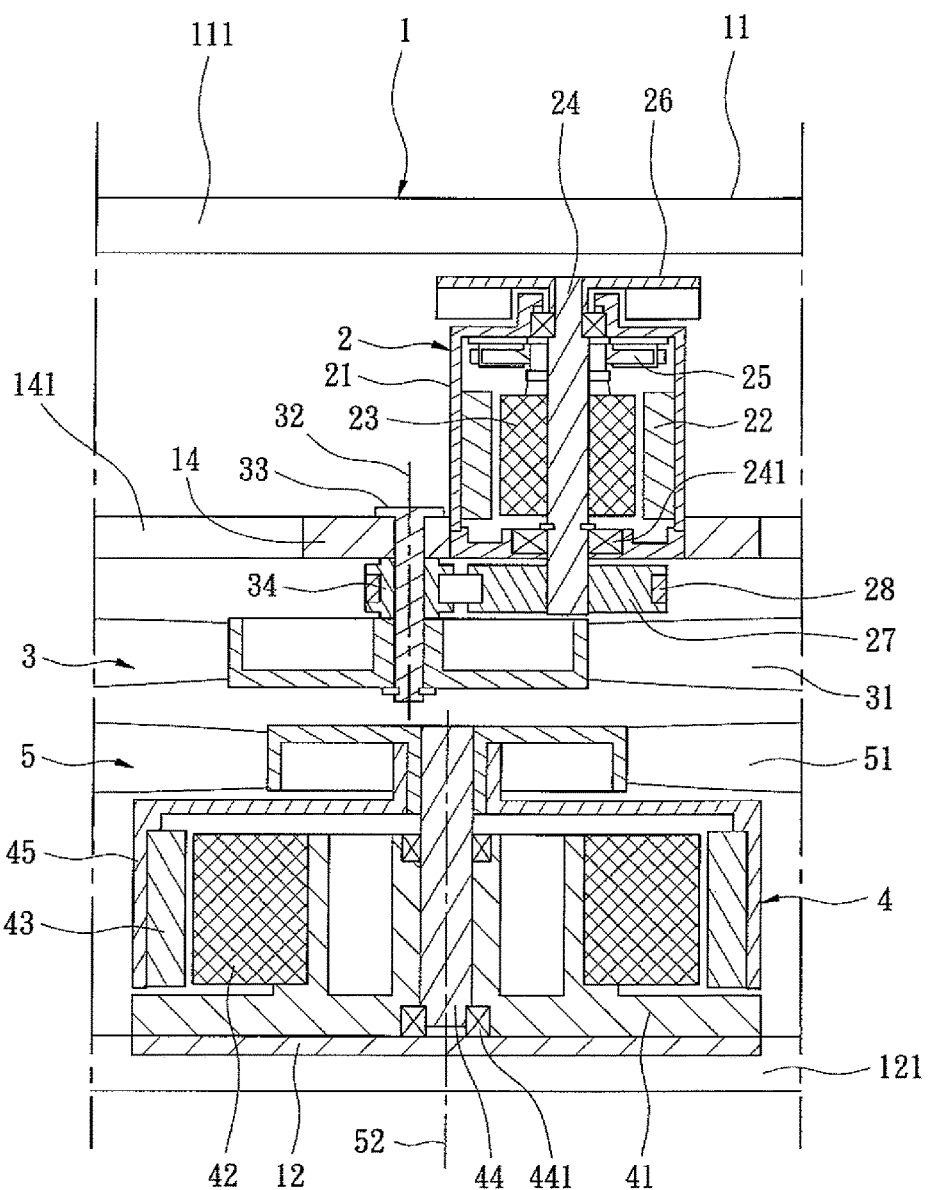
FIG. 7 is an enlarged view of a portion of the electric fan-type power generating device of FIG. 6.

FIGS. 6 and 7 show a third embodiment similar to the second embodiment, wherein like reference numerals are used to designate like elements. The third embodiment is different from the second embodiment by that the transmission wheel 27 and the driven wheel 34 are belt-driven wheels connected by a transmission belt 28.

Figure 8:
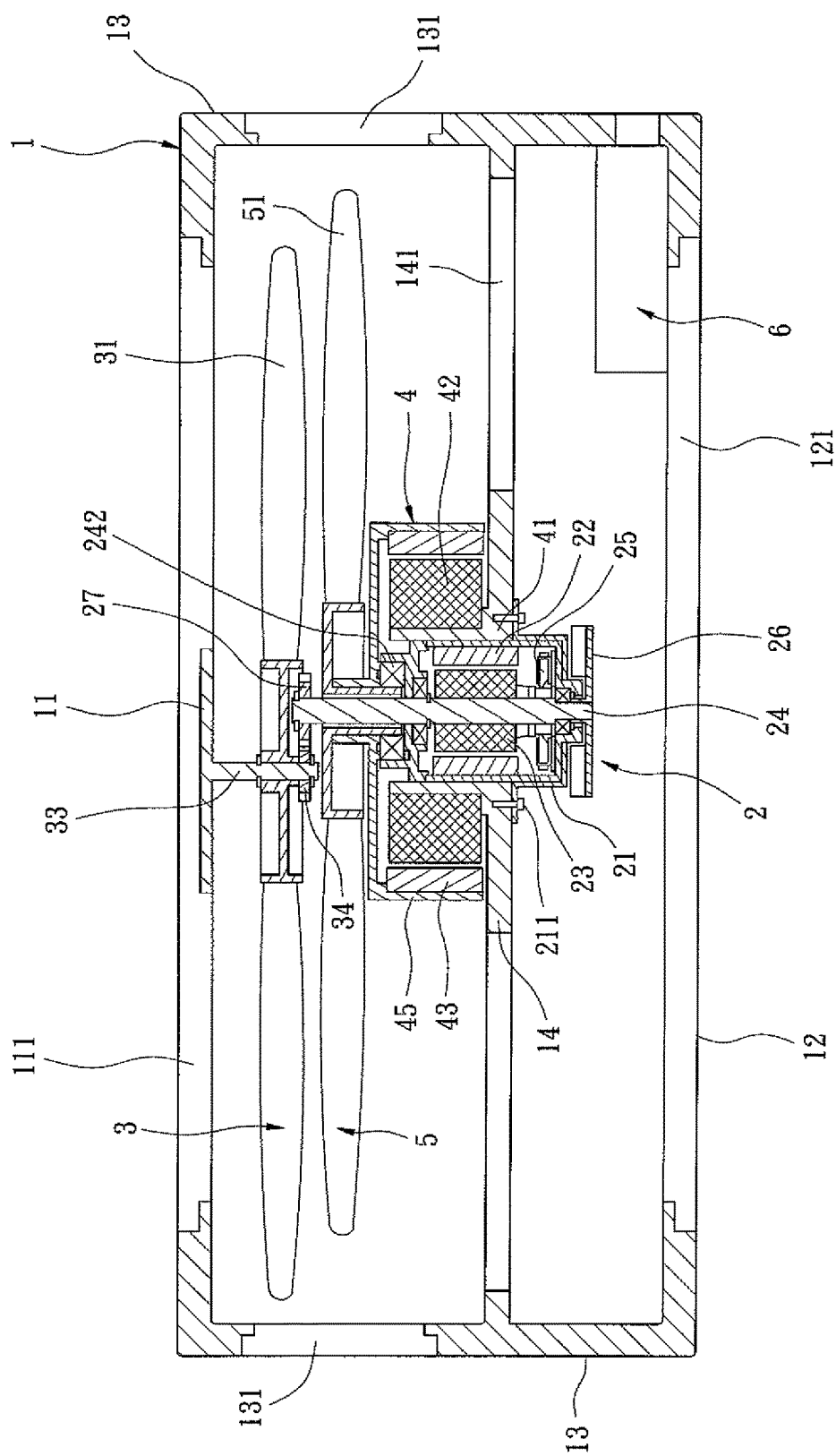
FIG. 8 is a diagrammatic cross sectional view of an electric fan-type power generating device with low energy consumption of a fourth example according to the present invention.
Figure 9:
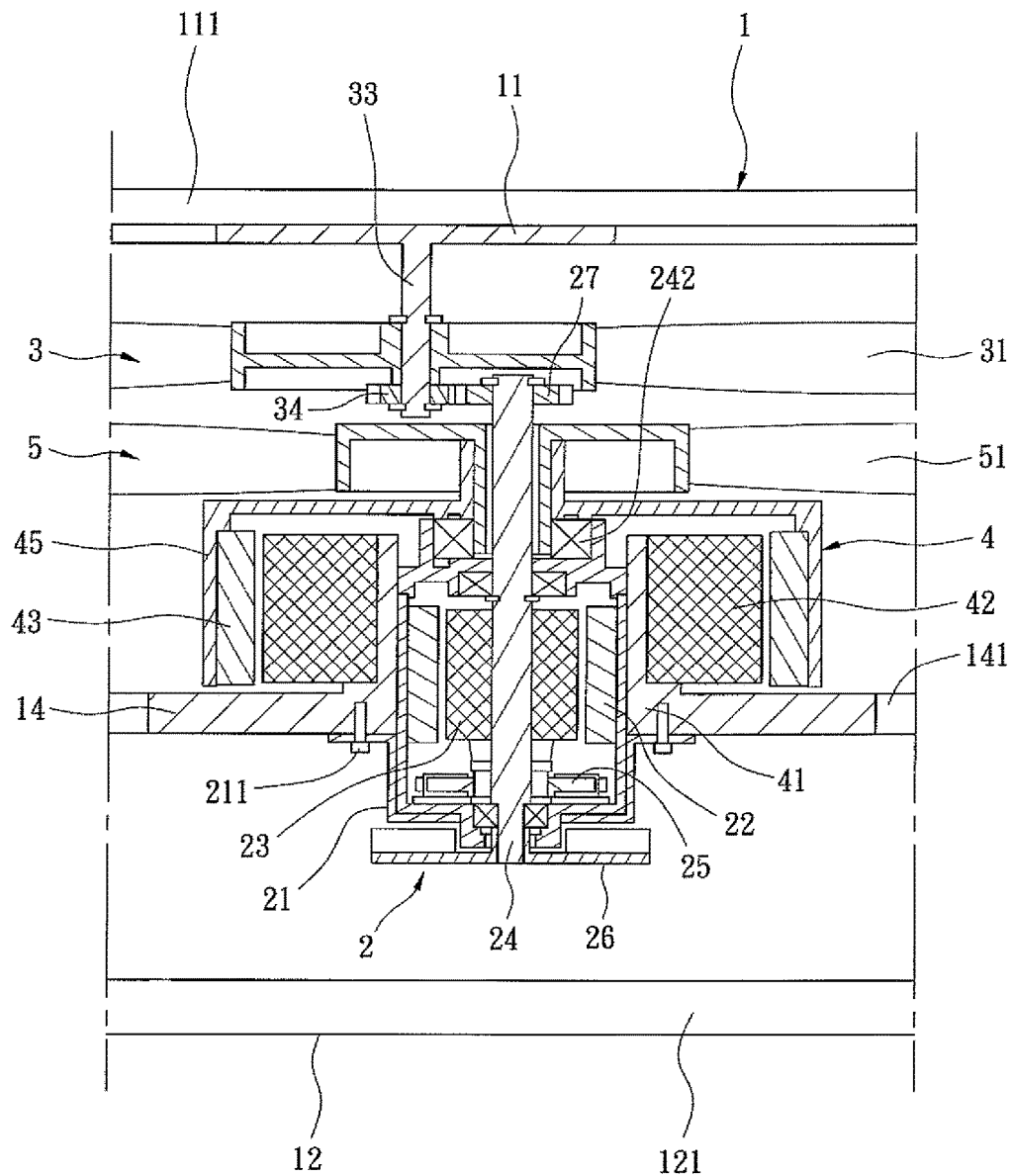
FIG. 9 is an enlarged view of a portion of the electric fan-type power generating device of FIG. 8.

FIGS. 8 and 9 show a fourth embodiment similar to the second embodiment, wherein like reference numerals are used to designate like elements. The fourth embodiment is different from the second embodiment by that the motor casing 21 of the electric motor 2 is fixed by bolts 211 to the support 14. The first shaft 24 extends through a central portion of the second fan 5 and has an end fixed to a transmission wheel 27. An axle 33 is fixed to the first sidewall 11 of the housing 1. The first fan 3 is rotatably mounted to the axle 33. A driven wheel 34 is mounted around the axle 33 and is located on a side of the central portion of the first fan 3. Thus, the transmission wheel 27 drives the driven wheel 34 and the first fan 3 to increase the rotational speed for increasing the wind power. The second stator 42 and the second rotor 43 of the generator 4 are concentrically mounted around the electric motor 2. The second rotor 43 is securely mounted around a rotor seat 45. A side of the rotor seat 45 is fixed to the central portion of the second fan 5. The central portion of the second fan 5 is rotatably mounted to an end of the motor casing 21 of the electric motor 2 via a bearing 242. When the electric motor 2 is activated, the first shaft 24 of the electric motor 2 drives the first fan 3 to generate wind power close to the second fan 5 that is offset from the first fan 3. The second fan 5 is driven by the wind power to drive the second rotor 43 of the generator 4. Thus, the generator 4 generates electricity that can be outputted.

Although specific embodiments have been illustrated and described, numerous modifications and variations are still possible without departing from the scope of the invention. The scope of the invention is limited by the accompanying claims.

The invention claimed is:

1. An electric fan-type power generating device with low energy consumption, comprising:
   a housing including a first sidewall, a second sidewall opposite to the first side wall, and a peripheral wall interconnected between the first sidewall and the second sidewall, with the housing including a plurality of vents;
   an electric motor mounted in the housing, with the electric motor including a first stator and a first rotor concentric to the first stator, with a first shaft extending through a central portion of the first rotor and coupled to the first rotor;
   a first fan driven by the first rotor and the first shaft of the electric motor;
   a generator mounted in the housing, with the generator including a second stator and a second rotor concentric to the second stator;
   a second fan driving the second rotor of the generator to rotate, with the first fan and the second fan located opposite to and adjacent to each other; and
   a power device mounted in the housing, with the power device including a chargeable battery connected to a start switch, with the chargeable battery connected to the generator, and with the start switch connected to the electric motor, wherein when the chargeable battery supplies electricity to the electric motor, the first shaft of the electric motor drives the first fan to rotate to thereby generate wind power close to the second fan, wherein the second fan is driven by the wind power to drive the second rotor of the generator, and the generator generates electricity to the chargeable battery,
   wherein the first fan has a central axis offset from a central axis of the second fan in a radial direction perpendicular to the central axes, wherein air flows around in the housing and generates turbulence to proceed with input and output of air,
   with the housing further including a support located between the first sidewall and the second sidewall, with the electric motor including a motor casing fixed to a side of the support facing the first sidewall, with the first shaft including an end extending to another side of the support, with the generator fixed to the second sidewall, with the first fan located between the support and the second fan, and with the second fan located between the first fan and the second sidewall.

2. The electric fan-type power generating device with low energy consumption as claimed in claim 1, with the plurality of vents of the housing defined in the first sidewall, the second sidewall, the peripheral wall, and the support, and with a heat dissipating fan fixed to another end of the first shaft.

3. The electric fan-type power generating device with low energy consumption as claimed in claim 1, with the generator further including a base fixed to the second sidewall, with the generator further including a second shaft rotatably mounted to a central portion of the base, with the second fan including a central portion fixed to the second shaft, with the second rotor concentrically mounted around the second stator, with the second rotor fixed to a rotor seat, and with the rotor seat including a side fixed to a central portion of the second fan.

4. The electric fan-type power generating device with low energy consumption as claimed in claim 1, wherein the first fan includes a central portion fixed to the end of the first shaft.

5. The electric fan-type power generating device with low energy consumption as claimed in claim 1, with the first shaft of the electric motor including an end fixed to a transmission wheel, with an axle fixed to the support, with the first fan rotatably mounted to the axle, with a driven wheel mounted around the axle and coupled with the transmission wheel, and with the transmission wheel driving the driven wheel and the first fan to proceed with acceleration or deceleration of rotation.

6. The electric fan-type power generating device with low energy consumption as claimed in claim 5, wherein a central axis of the second shaft is located between a central axis of the axle and a central axis of the first shaft in the radial direction.

7. An electric fan-type power generating device with low energy consumption, comprising:
   a housing including a first sidewall, a second sidewall opposite to the first side wall, and a peripheral wall interconnected between the first sidewall and the second sidewall, with the housing including a plurality of vents;
   an electric motor mounted in the housing, with the electric motor including a first stator and a first rotor concentric to the first stator, with a first shaft extending through a central portion of the first rotor and coupled to the first rotor;
   a first fan driven by the first rotor and the first shaft of the electric motor;

a generator mounted in the housing, with the generator including a second stator and a second rotor concentric to the second stator;

a second fan driving the second rotor of the generator to rotate, with the first fan and the second fan located opposite to and adjacent to each other; and a power device mounted in the housing, with the power device including a chargeable battery connected to a start switch, with the chargeable battery connected to the generator, and with the start switch connected to the electric motor, wherein when the chargeable battery supplies electricity to the electric motor, the first shaft of the electric motor drives the first fan to rotate to thereby generate wind power close to the second fan, wherein the second fan is driven by the wind power to drive the second rotor of the generator, and the generator generates electricity to the chargeable battery, wherein the first fan has a central axis offset from a central axis of the second fan in a radial direction perpendicular to the central axes, wherein air flows around in the housing and generates turbulence to proceed with input and output of air, with the electric motor including a motor casing fixed in the housing, with the first shaft including an end extending through a central portion of the second fan, with a transmission wheel fixed to the end of the first shaft, with an axle fixed to the first sidewall of the housing, with the first fan rotatably mounted to the axle, with a driven wheel mounted around the axle, with the transmission wheel driving the driven wheel and the first fan to increase a rotational speed for increasing the wind power, with the generator concentrically mounted around the electric motor, with the second rotor securely mounted around a rotor seat, with the rotor seat including a side fixed to the central portion of the second fan, and with the central portion of the second fan rotatably mounted to the motor casing of the electric motor.

8. The electric fan-type power generating device with low energy consumption as claimed in claim 7, with the power device further including a charging controller serially connected between the chargeable battery and the generator, and with the charging controller electrically connected to a voltage boost controller for outputting electricity.

* * * * *